United States Patent
Tiana

(10) Patent No.: US 8,711,220 B2
(45) Date of Patent: Apr. 29, 2014

(54) AUTOMATIC DETECTION OF IMAGE DEGRADATION IN ENHANCED VISION SYSTEMS

(75) Inventor: Carlo L. M. Tiana, Portland, OR (US)

(73) Assignee: Aireyes, Inc., Portland, OR (US)

( * ) Notice: Subject to any disclaimer, the term of this patent is extended or adjusted under 35 U.S.C. 154(b) by 313 days.

(21) Appl. No.: 13/215,577

(22) Filed: Aug. 23, 2011

(65) Prior Publication Data

US 2013/0050485 A1 Feb. 28, 2013

(51) Int. Cl.
*G01C 11/02* (2006.01)
(52) U.S. Cl.
USPC ........... 348/144; 348/145; 348/146; 348/147; 348/148; 348/180; 359/333
(58) Field of Classification Search
USPC ............... 340/578, 945, 946; 345/8; 348/144, 348/148, 180; 359/333
See application file for complete search history.

(56) References Cited

U.S. PATENT DOCUMENTS

| | | | |
|---|---|---|---|
| 7,180,476 B1 * | 2/2007 | Guell et al. | 348/148 |
| 7,525,448 B1 * | 4/2009 | Wilson et al. | 340/945 |
| 7,642,929 B1 * | 1/2010 | Pinkus et al. | 340/946 |
| 2003/0214586 A1 * | 11/2003 | Lee et al. | 348/180 |
| 2004/0169617 A1 * | 9/2004 | Yelton et al. | 345/8 |
| 2005/0012626 A1 * | 1/2005 | Owrutsky et al. | 340/578 |
| 2009/0138138 A1 * | 5/2009 | Ferren et al. | 359/333 |

FOREIGN PATENT DOCUMENTS

EP 697677 A2 * 2/1996 ............... G06T 7/00

OTHER PUBLICATIONS

"Image Analysis and Processing", National Instruments Corporation, May 15 2008, http://www.ni.com/white-paper/3470/en/.*
Munitions Directorate (AFRL/MN), "AFRL Develops Partial Solution to Helicopter Brownout", Air Force Print News Today, Aug. 28, 2007.
Wachspress et al., "Physics Based Modeling of Helicopter Brownout for Piloted Simulation Applications", Interservice/Industry Training, Simulation and Education Conference, paper No. 8177, Dec. 1, 2008.
Keller et al., "A Physics-Based Model of Rotorcraft Brownout for Flight Simulation Applications", American Helicopter Society 62nd Annual Forum, p. 1, May 9, 2006.
Sabbagh, "Flying Blind in Iraq: U.S. Helicopters Navigate Real Desert Storms", PopularMechanics.com, Oct. 3, 2006.

* cited by examiner

*Primary Examiner* — Dave Czekaj
*Assistant Examiner* — Shanika Brumfield
(74) *Attorney, Agent, or Firm* — NUPAT, LLC; Morrison Ulman

(57) ABSTRACT

Systems and methods are described that directly detect whether or not enhanced vision system images obtained from a moving vehicle are degraded. If they are, image display is turned off to reduce operator distraction. When image quality is restored, image display is turned back on so operators can take advantage of EVS capabilities.

22 Claims, 11 Drawing Sheets

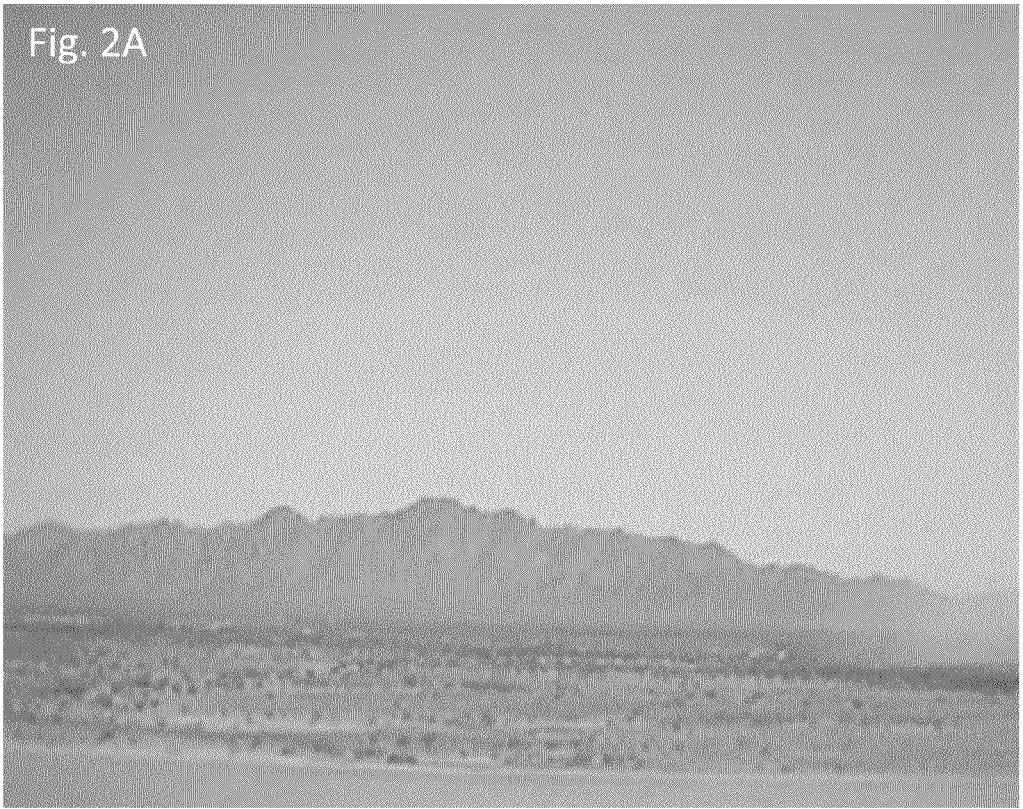

AUTOMATIC DETECTION OF IMAGE DEGRADATION IN ENHANCED VISION SYSTEMS

TECHNICAL FIELD

The disclosure is generally related to monitoring image quality of enhanced vision systems.

BACKGROUND

Enhanced vision systems (EVS) increase vehicle operators' situational awareness in low-visibility conditions. Radar, for example, helps a ship captain maneuver in fog. Forward-looking infrared (FLIR) sensors can help a helicopter pilot see animals in a landing zone at night. EVS are based on one or more sensor technologies such as radar, FLIR, lidar, or video cameras sensitive to various wavelengths or spectral bands. Each of these sensors can see through some visibility impairments, but not others. A certain type of radar may be able to see through fog, but it may not be able to see through dust, for example. Hence the meaning of "clear" or "obstructed" visibility depends on the specific type of EVS sensor. Fog may be clear to some EVS sensors, but obstruct others.

Images from an EVS may be displayed on primary flight display or multifunction display in a glass cockpit or may be shown on a transparent, head-up display (HUD) (or helmet-mounted display (HMD) or head-worn display (HWD)) that is placed in the pilot's through-the-window field of vision. HUDs, HMDs and HWDs are especially compelling as they superimpose enhanced images on a natural view.

EVS images may become degraded for various reasons, however. Environmental factors such as dust, fog, smoke, clouds and snow may obstruct visibility. Helicopter brownout is a kind of obscuration caused by dust kicked up by a helicopter's downwash, for example. Brownout can quickly change a routine landing into a potentially deadly situation for helicopter pilots if they lose situational awareness near the ground. Electromagnetic interference or deliberate jamming may also degrade image quality.

FIGS. 1A and 1B illustrate a helicopter approaching a landing zone and suffering from brownout. In FIG. 1A helicopter 100 approaches landing zone 105 in clear conditions. Just prior to touchdown, the view of landing zone 105 is obscured by dust cloud 110 as shown in FIG. 1B. The dust cloud not only obscures the pilot's natural vision, but also degrades images from EVS. The degraded EVS images then become distractions to the pilot. The transition from the situation of FIG. 1A to that of FIG. 1B can take just a few seconds.

FIGS. 2A and 2B show an example of EVS images as image degradation due to brownout occurs. FIG. 2A shows clear conditions (i.e. clear to the particular type of sensor in use) while FIG. 2B shows the same scene when the sensor's view is obstructed by dust. Sometimes images from one type of sensor will be clear, i.e. like FIG. 2A, while images from another type of sensor are obstructed, i.e. like FIG. 2B, at the same time. Snow, fog and smoke may also obstruct sensor visibility.

Degraded EVS images are an unwanted, and possibly harmful, distraction to pilots. Degraded images may even obscure a pilot's view when presented on a HUD. Conventional EVS include a disable switch on the control yoke in an aircraft. This allows pilots to quickly turn off degraded EVS images, but it also means that pilots may not take full advantage of EVS. Pilots may leave EVS disabled in situations where it would actually be beneficial because they do not want to deal with potential distractions. Pilots may also leave EVS disabled if they are unaware that useful images have become available again after a period of image degradation.

Methods have been proposed to indirectly detect when an image might be degraded. Helicopter brownout conditions can be predicted to a certain extent based on altitude and airspeed, for example. Other indirect methods employ sensors to try to detect sources of obscuration such as smoke, rain or jamming. However, none of the existing methods directly detect whether or not an image is actually degraded.

What are needed are systems and methods that automatically and reliably monitor the quality of EVS images so pilots can realize EVS' full benefits.

BRIEF DESCRIPTION OF THE DRAWINGS

FIGS. 2A and 2B show an example of EVS images as image degradation due to brownout occurs.

DETAILED DESCRIPTION

The systems and methods described below directly detect whether or not EVS images are degraded. If they are, image display is turned off to reduce pilot distraction. Sensors continue to provide EVS images for degradation detection while display is off. When image quality is restored, image display is turned back on so pilots can take advantage of EVS capabilities.

Whether or not to display EVS images is decided on a sensor by sensor basis. For example, a clear lidar image may be displayed while a degraded FLIR image is not. The onset of EVS image degradation may also trigger a "see and remember" device that provides a buffered image captured immediately before degradation began.

The systems and methods involve computing image metrics from EVS image data. Image display is then enabled or disabled based on the value of the image metric. Data that lead to image metrics include pixel intensity, contrast, chromaticity and spatial frequency spectrum. The data are analyzed to compute statistical parameters such as minimum, maximum or mean pixel intensity, pixel color ratios, intensity histograms, and spatial frequency spectral characteristics. Finally, image metrics, i.e. decisions whether or not to display EVS images, are derived from statistical parameters crossing predetermined thresholds.

Performance may be improved by analyzing a selected sub-area within an EVS image. For example, an area above the horizon may be analyzed for chromatic content. If the selected area changes from blue to brown (e.g. from dust or sand partially obscuring the sky) the EVS image may be automatically turned off. When the area becomes blue again, the EVS image may be automatically turned back on. Selection of an analysis area may be aided by other vehicle instruments such as an attitude and heading reference system (AHRS) and/or inertial measurement unit (IMU), a global positioning system (GPS), or a synthetic vision system (SVS) database to account for obstacles such as mountains or buildings.

The threshold to turn on or off an image display may calibrated based on conditions such as location, weather and time of day. This threshold may be further adjusted manually by a pilot to account for specific situations or pilot preferences.

Figure 1:
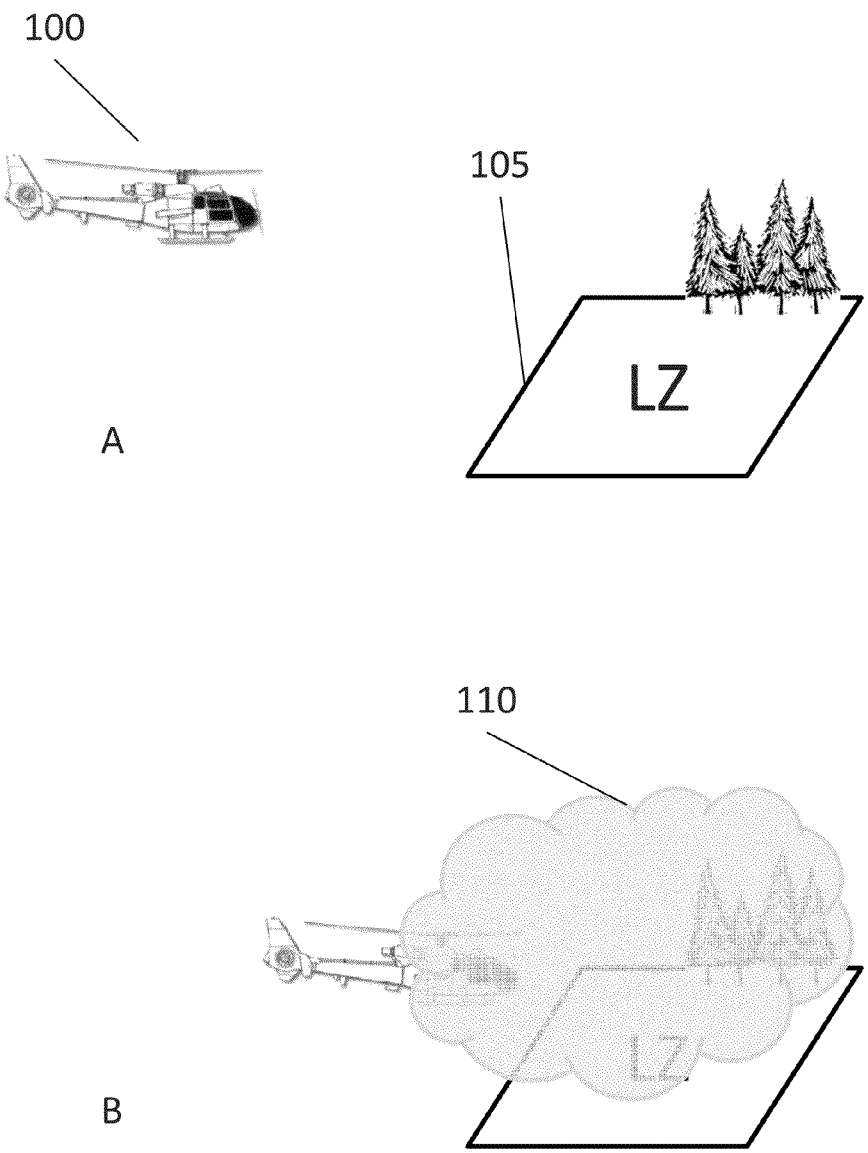
FIGS. 1A and 1B illustrate a helicopter approaching a landing zone and suffering from brownout.
Figure 3:
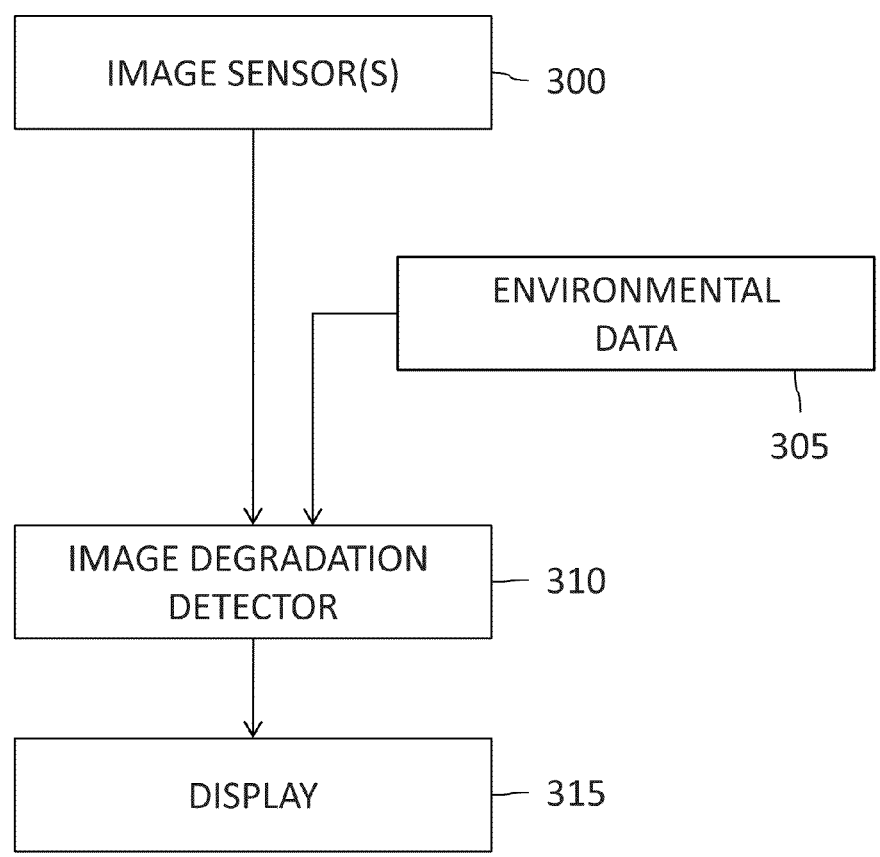
FIG. 3 is a block diagram for a system that controls an EVS display in response to changes in detected image quality.

FIG. 3 is a block diagram for a system that controls an EVS display in response to changes in detected image quality. Image sensor(s) 300 may be a video camera, radar, lidar, FLIR sensor, sonar (e.g. in a submarine), or other sensor, or any combination of such sensors. Data from image sensor(s) 300 is analyzed by image degradation detector 310. Detector 310 may be implemented on a general purpose computer, including a processor and memory, or an application specific computing device including, for example, a dedicated graphics processing unit.

Image degradation detector 310 uses data from image sensor(s) 300 and well as optional environmental data 305 to determine whether or not images from each sensor are degraded. When images are degraded, image degradation detector 310 disables display of those images on display 315. When image quality is acceptable, including for example when quality is restored after a period of degraded images, image degradation detector 310 enables display of images on display 315. Display 315 may be a CRT, LCD or other video display, or a head-up display.

Image degradation detector 310 includes a video memory buffer and may also function as a "see and remember" device that provides a buffered EVS image captured immediately before the onset of image degradation. The buffered image may be displayed on display 315 until acceptable live images become available. (A buffered image may be modified so that it appears to reflect a vehicle's changing position.)

Environmental data 305 includes any information useful to help determine whether or not images from image sensor(s) 300 have become degraded. Examples of environmental data include vehicle position and attitude, objects in a synthetic vision database, weather conditions and threshold adjustments input by a pilot.

Figure 4:
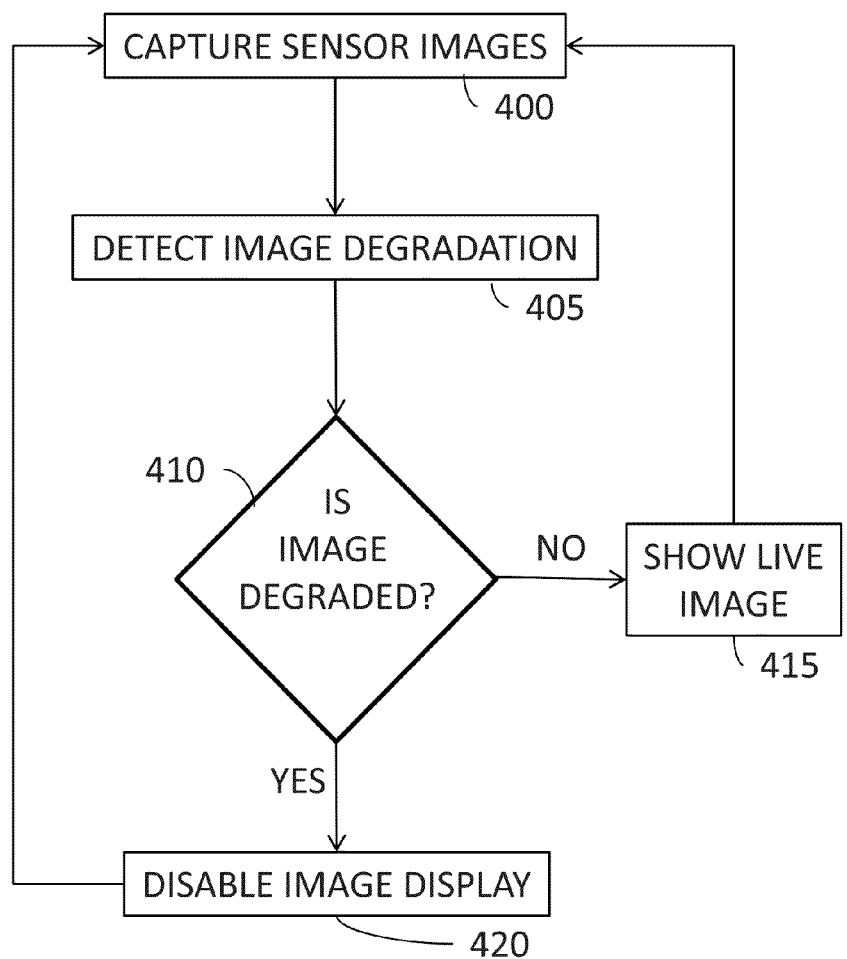
FIG. 4 is a flow diagram of a method for controlling an EVS display in response to changes in detected image quality.

The system of FIG. 3 performs methods such as that outlined in FIG. 4. FIG. 4 is a flow diagram of a method for controlling an EVS display in response to changes in detected image quality. In step 400, images are captured by an EVS sensor. In step 405, image degradation is detected. In step 410, a decision is made whether or not to display images based on detected image quality. If image quality is acceptable, step 410 (NO) leads to step 415 and images are displayed, or an alert is issued to notify an operator of the option to restart image display. If images are degraded, step 410 (YES) leads to step 420, and image display is disabled. Alternatively, if images are degraded, step 410 (YES) may trigger display of buffered images obtained before the onset of degradation. Finally, both steps 415 and 420 lead back to step 400 to form a loop. The methods of FIG. 4 may be implemented in an apparatus such as that shown in FIG. 3.

Figure 5:
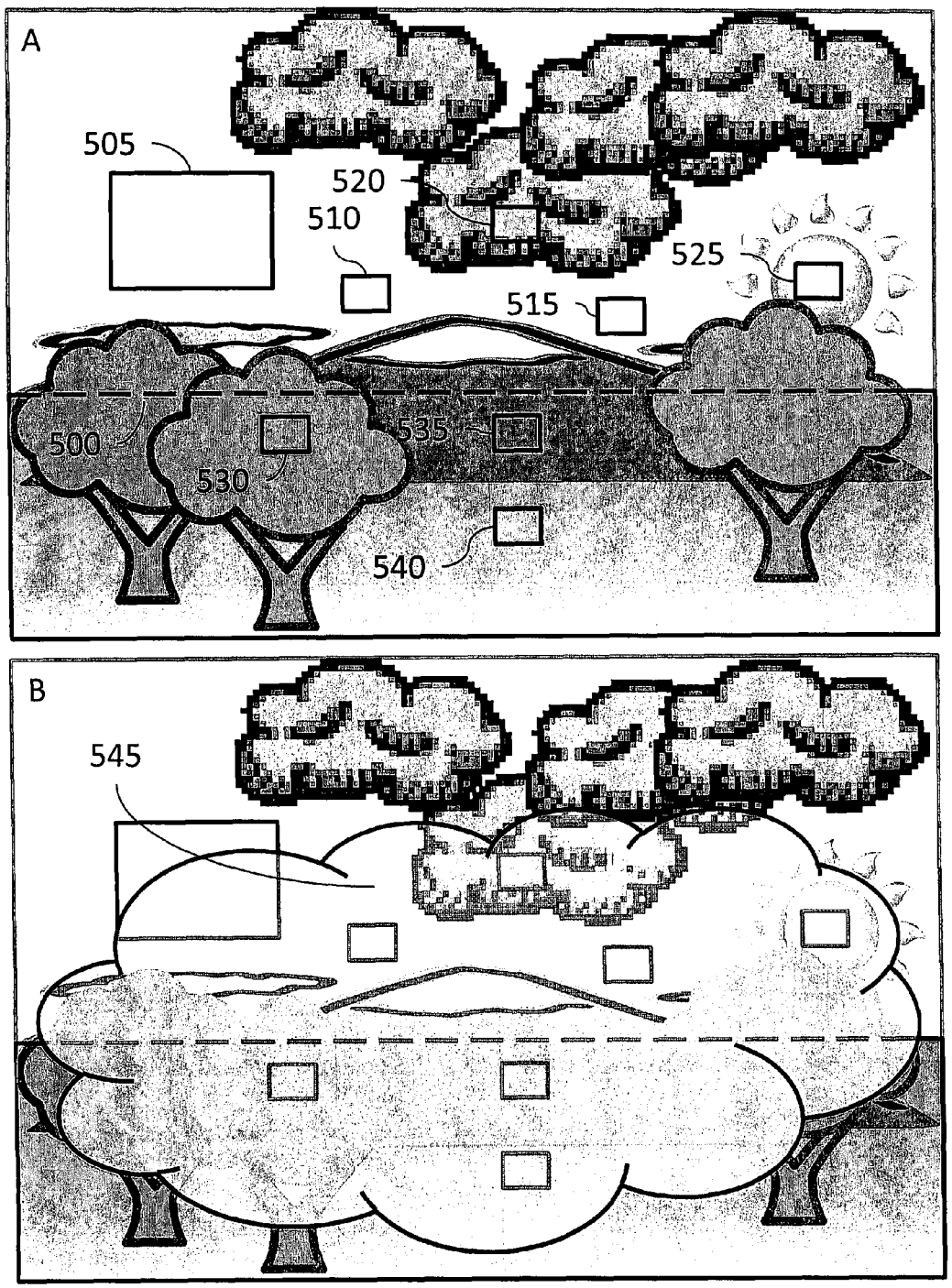
FIGS. 5A and 5B illustrate selection of analysis areas of an EVS image used to determine image quality during clear and obstructed conditions.

Detection of image degradation (e.g. step 405 performed, e.g., by detector 310) involves selecting a part of an image for analysis and then performing one or more statistical operations on image data. FIGS. 5A and 5B illustrate selection of analysis areas of an EVS image used to determine image quality during clear and obstructed conditions. Example analysis sub-areas are shown as rectangles in the figures; however, analysis areas may be of any size or shape and may include an entire image or any section or sections of the image. Each analysis area in FIGS. 5A and 5B may be tracked using AHRS and/or INS vehicle position, heading and attitude information.

In FIG. 5A, dashed line 500 indicates the horizon as determined by AHRS or INS. Example analysis areas include sections of open sky 505, 510 and 515, the sun 525, tree canopy 530 and ground 540. Environmental data may also be used to aid in selection of analysis areas by providing information on mountains 535 or cloud cover 520. For example, a synthetic vision data base contains information on when to expect mountains to appear above the horizon. In FIG. 5B, dust cloud (or whiteout, fog, etc.) 545 has obscured the view in most of the analysis areas of FIG. 5A.

In each analysis area one or more statistical parameters are monitored for changes to generate image metrics. Image metrics may be based on the value of a statistical parameter crossing a threshold value. Thresholds may encompass a range of values to introduce hysteresis. Thus a statistical parameter exceeding a certain threshold may result in turning off an EVS display, but the display is not turned back on until the parameter falls below another threshold, lower than the first. This prevents flicker or false alarms when statistical parameters are near thresholds. Statistical changes may be based on data within an analysis area or with respect to other analysis areas. Several examples illustrate how image metrics or degradation decisions are determined.

The examples discussed below are based on analysis of 24-bit red, green, blue (RGB) images. Each pixel in an image is characterized by integer red, green and blue intensities ranging between zero and 255. A white pixel is represented by red, green and blue all having intensity 255, while a black pixel is represented by red, green and blue all having intensity zero. Of course, the methods described below are applicable to any monochrome or color EVS digital image.

Figure 6:
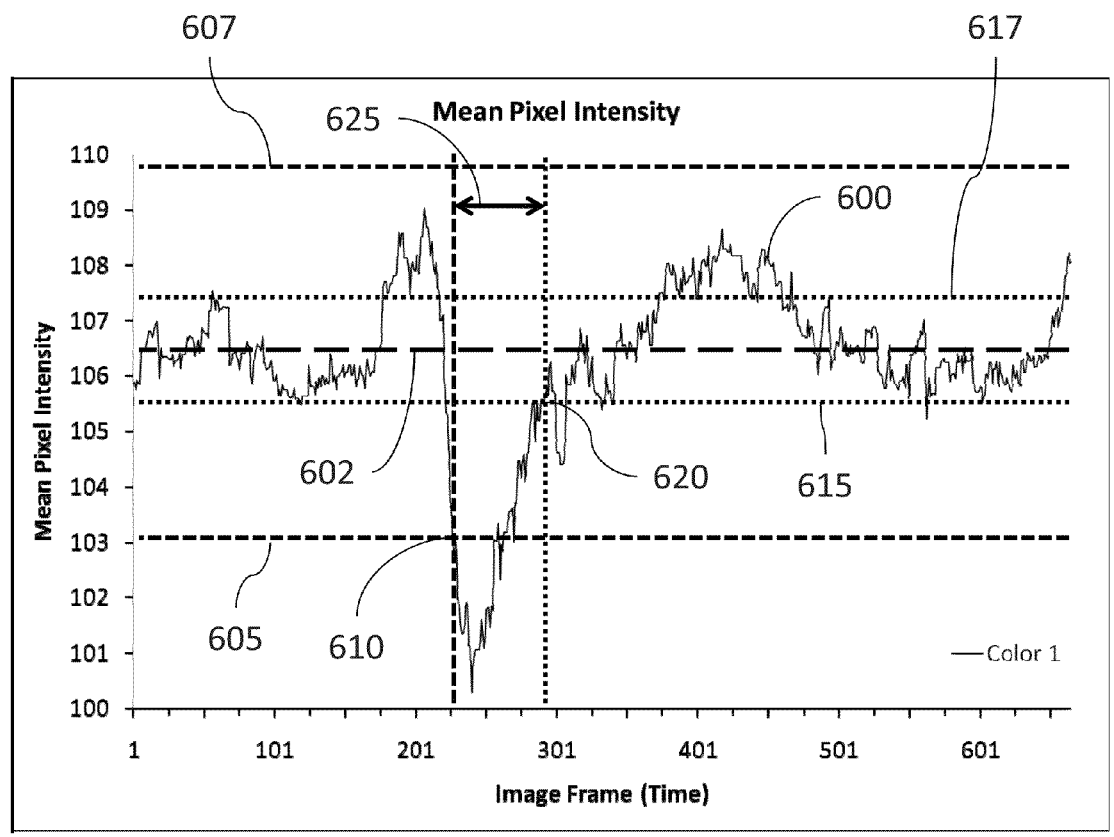
FIG. 6 is a graph of mean pixel intensity versus image frame number.

FIG. 6 is a graph of mean pixel intensity versus image frame number for an analysis area of an EVS image. Image frame number is equivalent to time when sensors provide a constant number of frames per second. Typical sensors generate between 1 and 100 frames per second, for example.

Trace 600 is the mean pixel intensity in the analysis area. Mean pixel intensity may be updated after each new image frame or it may be a moving average over a few frames. The number of frames used in a moving average is chosen to smooth out noise while still providing adequate response to changing image conditions; usually a few seconds of imagery suffices. Mean pixel intensity may be computed for one color channel or summed over two or more colors.

Dashed line 602 is a long-term average of the mean pixel intensity. It is calculated over a period of several minutes or more and provides a reference to compare to short-term fluctuations of trace 600. Alternatively, the value of line 602 may be fixed at a given value based on known environmental conditions; for example, the pixel intensity of clear sky in a certain location with known weather conditions and at a given time of day may yield a known value for line 602.

Lines 605 and 607 are the thresholds that determine the onset of image degradation. If trace 600 crosses below threshold 605 or above threshold 607, the image is determined to be degraded. In FIG. 6, trace 600 crosses threshold 605 at point 610; thus the image is determined to be degraded after point

610. The values of thresholds 605 and 607 are determined by several methods. One method is to use a comparison to a different analysis area of the same image. For example, in FIG. 5A, area 540 may be used to determine the threshold value for image degradation due to brownout. Another method to determine the values of thresholds 605 and 607 is by setting statistical limits based on the standard deviation of trace 600 below and above the long-term average line 602. A third method to determine the values of thresholds 605 and 607 is by using a fixed value based on known environmental conditions, as described in the example for line 602 above. Thresholds 605 and 607 need not be the same distance from line 602, and each is independently adjustable as conditions warrant.

Lines 615 and 617 are the threshold values that are used, once an image has become degraded, to determine when the image has returned to clear. For example, once the image area in FIG. 6 is determined to be degraded after point 610, trace 600 then crosses threshold 615 at point 620, and the image after point 620 is determined to be clear. The values for thresholds 615 and 617 are determined by comparison, statistical limits, or known values, similar to thresholds 605 and 607 above. They may be different distances below and above line 602.

Many of the thresholds described for FIG. 6 are partially determined by environmental factors including recent and current weather conditions and location. Hence threshold values change over time. In addition, a vehicle operator may manually adjust values to suit personal preferences. For example, a pilot may increase a threshold so that only very clear EVS images are shown or decrease it to show marginal images.

Images from an EVS sensor may be considered degraded when a single analysis area within the images is degraded or only when several such areas are affected. Thus image degradation metrics may take into account statistical parameters derived from one or more color channels covering one or more analysis areas. A metric may be determined by parameters crossing threshold values for a little as one image frame or for several frames. Thresholds may be different depending on whether a parameter crosses a threshold from above or below. When an image metric indicates degradation, image display may be stopped or a buffered image may be shown.

Other examples of statistical parameters used to determine image metrics include maximum or minimum pixel intensity, pixel color, intensity histograms and spatial frequency spectra, as described below.

Figure 7:
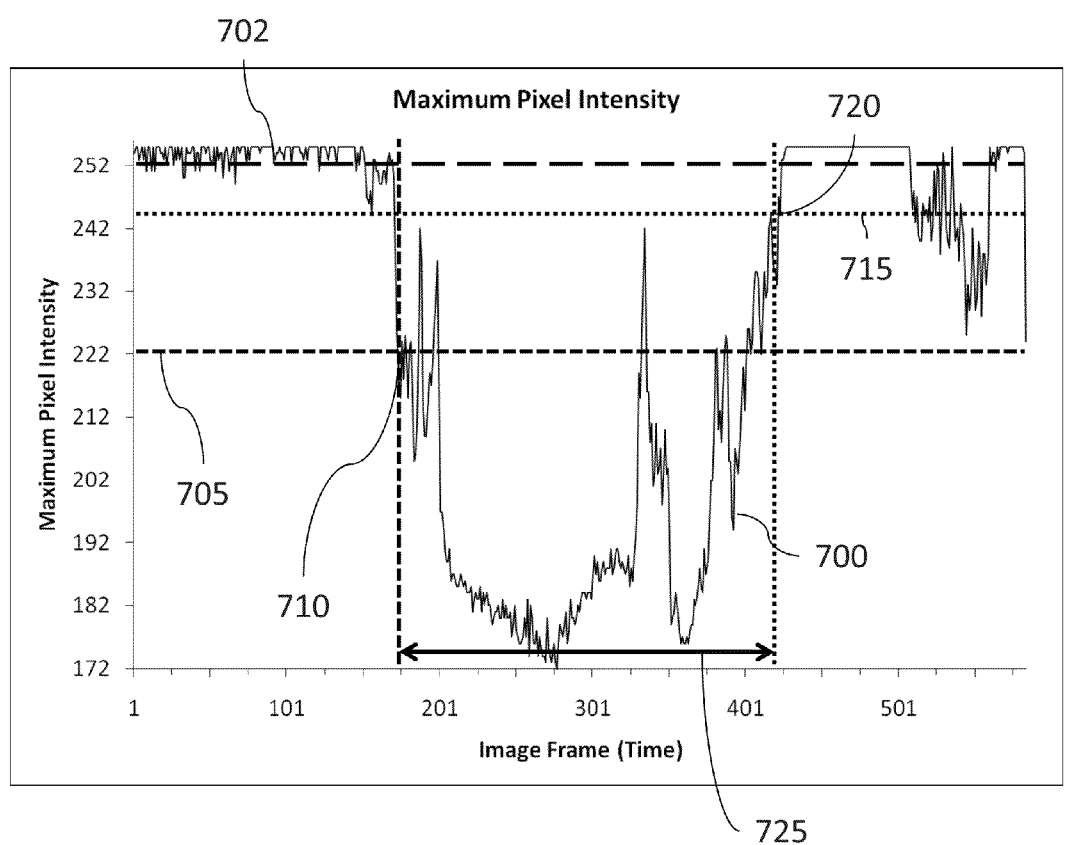
FIG. 7 is a graph of maximum pixel intensity versus image frame number.

FIG. 7 is a graph of maximum pixel intensity versus image frame number for an analysis area of an EVS image. Image frame number is equivalent to time when sensors provide a constant number of frames per second. Typical sensors generate between 1 and 100 frames per second, for example.

Trace 700 is the maximum pixel intensity in the analysis area. Similar to the case of mean pixel intensity above, maximum pixel intensity may be updated after each new image frame or it may be a moving average over a few frames. The number of frames used in a moving average is chosen to smooth out noise while still providing adequate response to changing image conditions; usually a few seconds of imagery suffices. Maximum pixel intensity may be computed for one color channel or summed over two or more colors.

Dashed line 702 is a long-term average of the maximum pixel intensity. Line 705 is a threshold that determines the onset of image degradation. Line 715 is a threshold value that determines when an image has returned to clear. The values for lines 702, 705, and 715 are determined similar to the values for lines 602, 605, and 615 described above. In FIG. 7 values for trace 700 and line 702 in clear conditions are near the maximum possible pixel intensity value so no counterpart lines to lines 607 or 617 are shown. However, if a circumstance arises where this is not the case, additional threshold lines above line 702 would be applicable, incorporating all the characteristics of lines 607 and 617 described above.

In FIG. 7, trace 700 crosses threshold 705 at point 710. Trace 700 then crosses threshold 715 at point 720. Thus the image is determined to be degraded during time period 725. Graphs similar to that in FIG. 7 may be analyzed for each color and for each analysis area within an EVS image. When a representative number of analysis areas are degraded, the entire image display may turned off or a buffered image may be shown.

Figure 8:
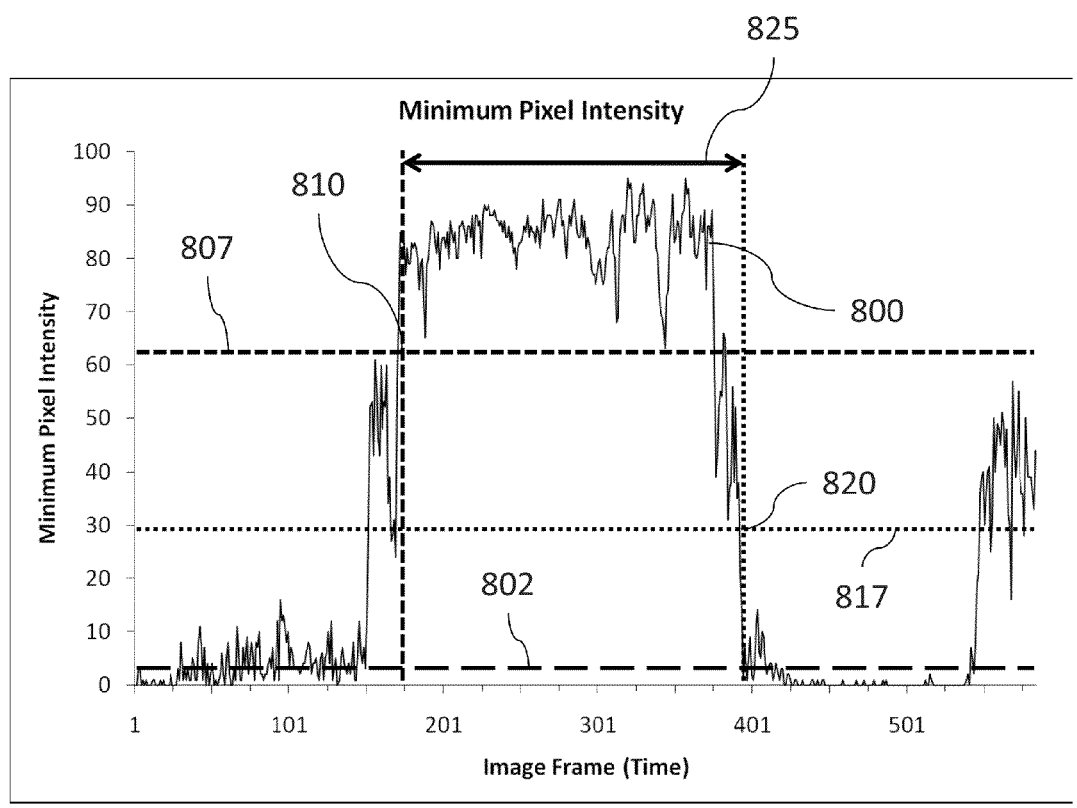
FIG. 8 is a graph of minimum pixel intensity versus image frame number.

FIG. 8 is a graph of minimum pixel intensity versus image frame number for an analysis area of an EVS image. Image frame number is equivalent to time when sensors provide a constant number of frames per second. Typical sensors generate between 1 and 100 frames per second, for example.

Trace 800 is the minimum pixel intensity in the analysis area. Similar to the cases of mean and maximum pixel intensity above, minimum pixel intensity may be updated after each new image frame or it may be a moving average over a few frames. The number of frames used in a moving average is chosen to smooth out noise while still providing adequate response to changing image conditions; usually a few seconds of imagery suffices. Minimum pixel intensity may be computed for one color channel or summed over two or more colors.

Dashed line 802 is a long-term average of the minimum pixel intensity. Line 807 is a threshold that determines the onset of image degradation. Line 817 is a threshold value that determines when an image has returned to clear. The values for lines 802, 807, and 817 are determined similar to the values for counterpart lines 602, 607, and 617 described above. In FIG. 8 values for lines 800 and 802 in clear conditions are near the minimum possible pixel intensity value so no counterpart lines to lines 605 or 615 are shown. However, if a circumstance arises where this is not the case, additional threshold lines below line 802 would be applicable, incorporating all the characteristics of lines 605 and 615 described above.

In FIG. 8, trace 800 crosses threshold 807 at point 810. Trace 800 then crosses threshold 817 at point 820. Thus the image is determined to be degraded during time period 825. Graphs similar to that in FIG. 8 may be analyzed for each color and for each analysis area within an EVS image. When a representative number of analysis areas are degraded, the entire image display may turned off or a buffered image may be shown.

Figure 9:
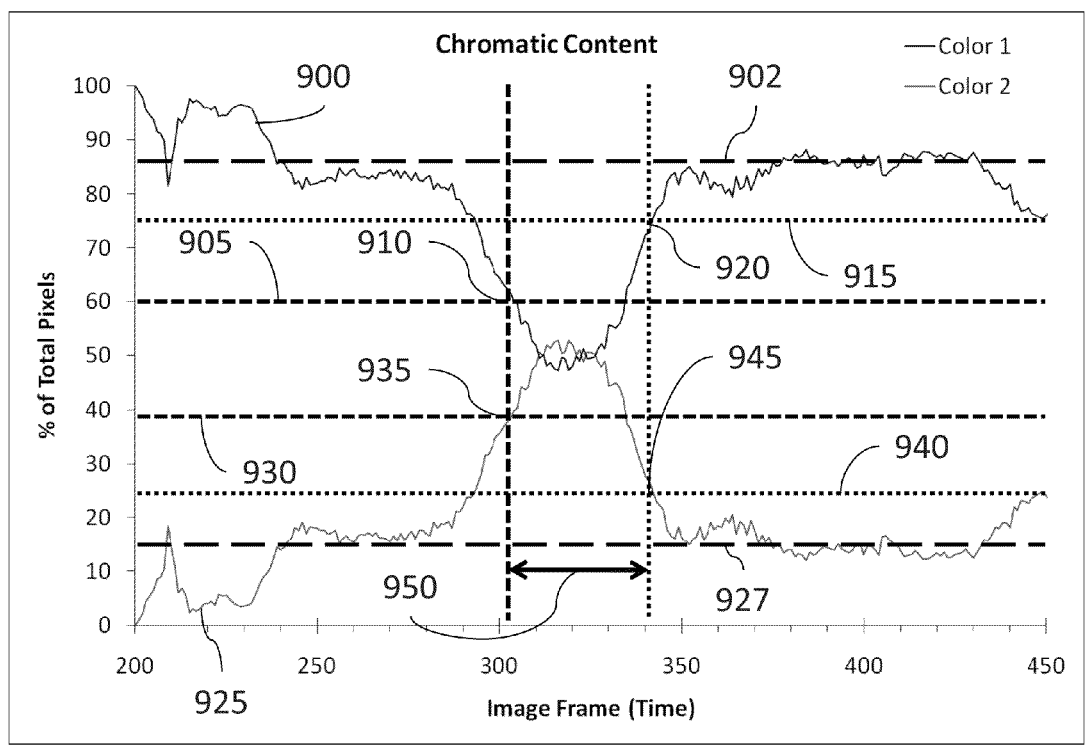
FIG. 9 is a graph of pixel chromaticity versus image frame number.

FIG. 9 is a graph of pixel chromaticity versus image frame number. Chromaticity is a measure of color that is independent of intensity and is represented in FIG. 9 as a relative percentage of one color or colors compared to another color or colors. Image frame number is equivalent to time when sensors provide a constant number of frames per second. Typical sensors generate between 1 and 100 frames per second, for example.

In FIG. 9, traces 900 and 925 represent the moving averages of different color percentages used to determine image degradation. For example, using an area of clear sky for an analysis region, trace 900 may be nearly 100 percent blue and trace 925 may be nearly zero percent brown. As the percentage of blue decreases and brown increases the likelihood of brownout-induced image degradation becomes greater. In another example, using a known area of tree canopy for an analysis region, trace 900 may be nearly 100 percent green and trace 925 may be nearly zero percent white. As the percentage of green decreases and white increases the likelihood of whiteout-induced image degradation becomes greater.

Dashed lines in FIG. 9 represent thresholds similar to those described in FIGS. 6-8. Lines 902 and 927 are long-term average values for traces 900 and 925, respectively. Lines 905 and 930 are threshold values that determine the onset of image degradation. For example, after trace 900 crosses line 905 at point 910, the image is determined to be degraded. Or, when trace 925 crosses line 930 at point 935, the image is also determined to be degraded. Lines 915 and 940 are threshold values that determine when an image is clear. For example, when trace 900 crosses line 915 at point 920, the image is determined to be clear. Or, when trace 925 crosses line 940 at point 945, the image is also determined to be clear. Time period 950 represents the time when the analysis area of the image is degraded. If needed, additional thresholds may be added on opposite sides of lines 902 and 927. As with previous examples in FIGS. 6-8, the values for thresholds may be determined by comparison, statistical limits, environmental data or operator input, and multiple analysis areas may be monitored simultaneously.

Figure 10:
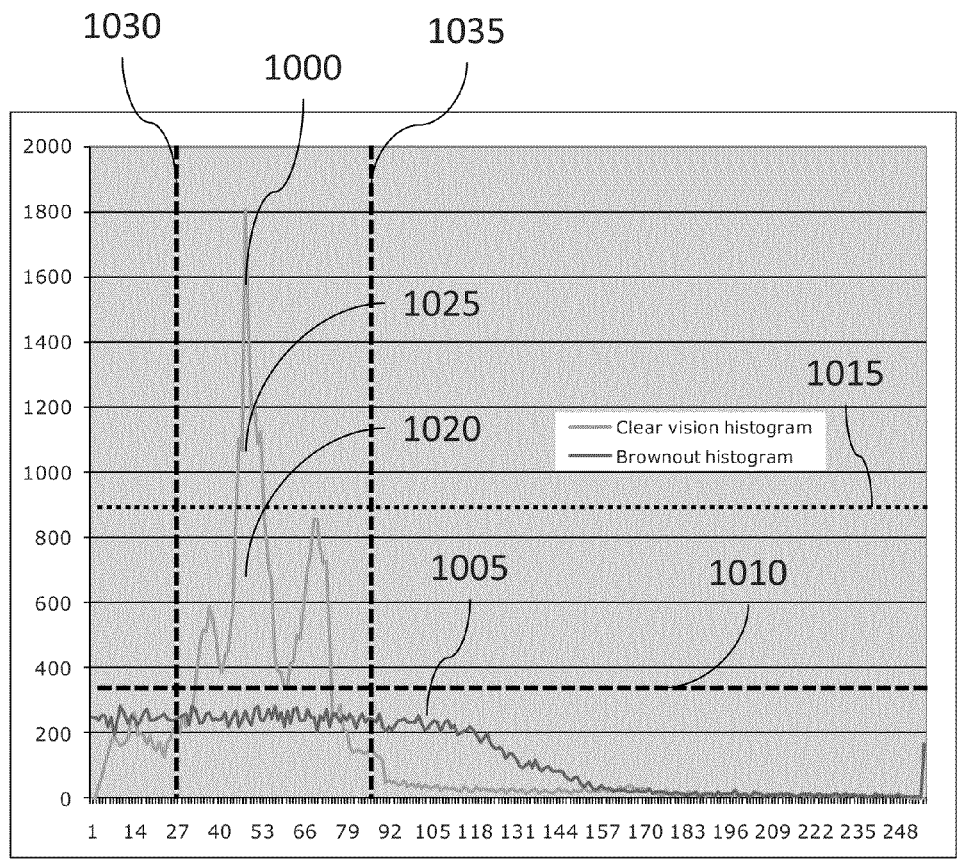
FIG. 10 is a pixel intensity histogram.

Histograms offer additional statistical techniques for establishing image degradation. FIG. 10 is a pixel intensity histogram for one or more colors in one or more frames of an analysis area of an EVS image. The number of pixels having a given intensity is plotted versus pixel intensity. Alternatively the percentage of pixels at a given intensity may be plotted versus pixel intensity.

Trace 1000 is a pixel intensity histogram of an analysis area in clear conditions. Trace 1005 is a pixel intensity histogram of an analysis area in obstructed conditions that lead to image degradation. Line 1010 is a threshold that determines when an image has become degraded. If the area 1020 defined between trace 1000 (or trace 1005) and line 1010 falls below a set limit, the image is determined to be degraded. Line 1015 is a threshold value that determines when an image has returned to clear. If the area 1025 defined between trace 1000 (or trace 1005) and line 1015 rises above a set limit, the image is determined to be clear. Areas 1020 and 1025 may be further defined, if necessary, by lines 1030 and 1035. The result is an area defined between trace 1000 (or trace 1005) and line 1010, and between lines 1030 and 1035; and an area defined between trace 1000 (or trace 1005) and line 1015, and between lines 1030 and 1035.

Graphs similar to that in FIG. 10 may be analyzed for each image frame generated by an EVS, or over longer intervals. Graphs may be analyzed for each color and for each analysis area within an EVS image. Also, pixel intensity may be measured independent of color. As with previous examples in FIGS. 6-9, values for thresholds are determined by comparison, statistical limits, environmental data or pilot input. Multiple analysis areas may be monitored simultaneously.

FIGS. 11A and 11B are spatial Fourier transforms of EVS images during clear and obstructed conditions. Fourier transforms are computed radially and then averaged. This procedure removes orientation dependence of spatial frequencies and is based on an assumption that there is no preferred direction of spatial frequency information within a scene.

In FIGS. 11A and 11B the magnitude scale is arbitrary, but the same for each graph. Likewise the units of spatial frequency are arbitrary but the same for each graph. Trace 1100 is the spectrum of spatial frequencies in an analysis area in clear conditions while trace 1105 is the spectrum in obstructed conditions that lead to image degradation.

Lines 1110 and 1115 define low and high limits, respectively, of frequencies used in analysis. Line 1120 is a threshold value that determines when an image has become degraded. If area 1130 defined between trace 1100 (or trace 1105) and lines 1110, 1115, and 1120 falls below a set limit, the image is determined to be degraded. Line 1125 is the threshold value that is used to determine when an image is clear. If the area 1135 defined between trace 1100 (or trace 1105) and lines 1110, 1115, and 1125 rises above a set limit, the image is determined to be clear. Lines 1120 and 1125 may or may not have the same value.

Figure 11:
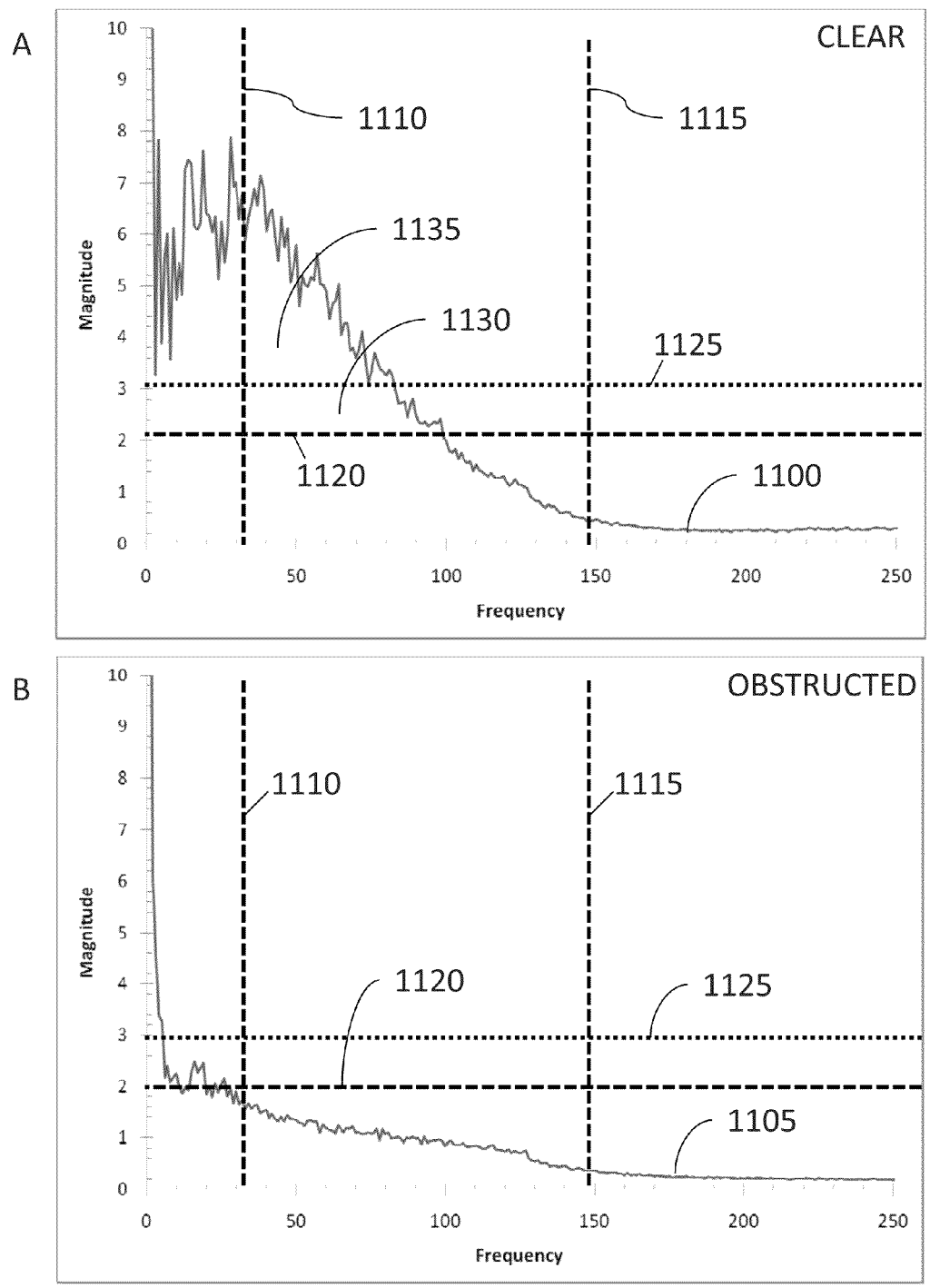
FIGS. 11A and 11B are spatial Fourier transforms of EVS images during clear and obstructed conditions.

Graphs similar to that in FIG. 11 may be analyzed for each image frame generated by an EVS, or over longer intervals. Graphs may be analyzed for each color and for each analysis area within an EVS image. As with previous examples in FIGS. 6-10, the values for thresholds may be determined by comparison, statistical limits, environmental data, or operator input.

Time delays may be included in the analysis techniques discussed above in connection with FIGS. 6-11 to reduce false positive and false negative determination of image degradation. Time delays require an image to remain in a state (degraded or not degraded) for a preset length of time before action is taken to disable or enable the image display, or show a buffered image. Practical time delays range from about 0.1 to 10 seconds.

Systems and methods for directly detecting whether or not enhanced vision system images are degraded have been described. These systems and methods increase the utility of EVS by reducing distractions and promoting use when usable images are available.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for detecting enhanced vision system image degradation comprising:
   providing a live video stream from an enhanced vision sensor mounted to a vehicle, the video having a frame rate between one and one hundred frames per second;
   selecting an analysis area in each video frame;
   monitoring a statistical parameter of the video stream as a function of time in the analysis area;
   calculating a long-term average value for the statistical parameter over a period of minutes;
   establishing first and second threshold values for the parameter; and,
   declaring the video stream degraded during any time period that:
      starts when the parameter deviates from the long-term average and crosses the first threshold, and ends when the parameter crosses the second threshold.

2. The method of claim 1 wherein the statistical parameter is mean pixel intensity.

3. The method of claim 1 wherein the statistical parameter is minimum pixel intensity or maximum pixel intensity.

4. The method of claim 1 wherein the statistical parameter is pixel chromaticity.

5. The method of claim 1 wherein the first threshold value is determined by comparison of two different analysis areas in each video frame.

6. The method of claim 1 wherein the first threshold value is determined in terms of standard deviations of the statistical parameter away from the long-term average value.

7. The method of claim 1 wherein the first threshold value is set according to operator input.

8. The method of claim 1 wherein the enhanced vision sensor comprises radar or lidar.

9. The method of claim 1 wherein the enhanced vision sensor comprises a forward-looking infrared sensor.

10. The method of claim 1 wherein the enhanced vision sensor comprises sonar.

11. The method of claim 1 wherein the vehicle is an aircraft.

12. A system for detecting enhanced vision system image degradation comprising:
   an enhanced vision system sensor mounted to a vehicle, the sensor providing a live video stream having a frame rate between one and one hundred frames per second;
   an image degradation detector that:
      selects an analysis area in each video frame,
      monitors a statistical parameter of the video stream as a function of time in the analysis area,
      calculates a long-term average value for the statistical parameter over a period of minutes, and
      establishes first and second threshold values for the parameter; and,
   a display that shows the video stream except during any time period that: starts when the parameter deviates from the long-term average and crosses the first threshold, and ends when the parameter crosses the second threshold.

13. The system of claim 12 wherein the statistical parameter is mean pixel intensity.

14. The system of claim 12 wherein the statistical parameter is minimum pixel intensity or maximum pixel intensity.

15. The system of claim 12 wherein the statistical parameter is pixel chromaticity.

16. The system of claim 12 wherein the first threshold value is determined by comparison of two different analysis areas in each video frame.

17. The system of claim 12 wherein the first threshold value is determined in terms of standard deviations of the statistical parameter away from the long-term average value.

18. The system of claim 12 wherein the first threshold value is set according to operator input.

19. The system of claim 12 wherein the enhanced vision sensor comprises radar or lidar.

20. The system of claim 12 wherein the enhanced vision sensor comprises a forward-looking infrared sensor.

21. The system of claim 12 wherein the enhanced vision sensor comprises sonar.

22. The system of claim 12 wherein the vehicle is an aircraft.

* * * * *